United States Patent [19]

Morgan et al.

[11] Patent Number: 4,610,787
[45] Date of Patent: Sep. 9, 1986

[54] CONVERTIBLE LIQUID FILTER

[75] Inventors: Howard W. Morgan, Michigan City, Ind.; Ronald L. Hartog, Three Oaks, Mich.

[73] Assignee: Filter Specialists, Inc., Michigan City, Ind.

[21] Appl. No.: 655,294

[22] Filed: Sep. 25, 1984

Related U.S. Application Data

[63] Continuation of Ser. No. 468,741, Feb. 22, 1983, abandoned.

[51] Int. Cl.$^4$ .............................................. B01D 29/10
[52] U.S. Cl. .................................... 210/239; 210/439; 210/455; 210/497.01
[58] Field of Search ............... 210/184, 186, 239, 304, 210/232, 323.1, 340, 323.2, 331, 341, 346, 447, 448, 451, 450, 452, 453, 455, 456, 473, 477, 519, 497.01, 439

[56] References Cited

U.S. PATENT DOCUMENTS

| | | | |
|---|---|---|---|
| 803,178 | 10/1905 | Leyson | 210/184 |
| 2,113,923 | 4/1938 | Miller | 210/453 |
| 3,341,023 | 9/1947 | Seter | 210/323.2 |
| 3,814,261 | 6/1974 | Morgan, Jr. | 210/453 |
| 4,022,693 | 5/1977 | Morgan, Jr. | 210/345 |
| 4,105,562 | 8/1978 | Kaplan et al. | 210/323.2 |
| 4,237,011 | 12/1980 | Acousta | 210/323.2 |
| 4,248,714 | 2/1981 | Acousta | 210/323.2 |
| 4,256,583 | 3/1981 | Lennartz | 210/340 |
| 4,285,814 | 8/1981 | Morgan, Jr. | 210/453 |

FOREIGN PATENT DOCUMENTS 1143279 2/1983 Fed. Rep. of Germany ...... 210/232

Primary Examiner—Richard V. Fisher
Assistant Examiner—Wanda L. Millard
Attorney, Agent, or Firm—James D. Hall

[57] ABSTRACT

An insert carrying cartridge filtering element for use in converting a liquid filter from a bag-type filter where fluid entering the filter flows into a bag and is strained through the bag to a cartridge-type filter where fluid entering the filter passes through the cartridge filtering element and exits the filter.

7 Claims, 4 Drawing Figures

CONVERTIBLE LIQUID FILTER

This is a continuation of co-pending application Ser. No. 468,741 filed on Feb. 22, 1983, now abandoned.

SUMMARY OF THE INVENTION

This invention relates to a liquid filter having an insert which converts the filter from a bag-type to a cartridge-type.

The present filter art includes both bag-type filters and cartridge-type filters. The bag-type filters are illustrated in U.S. Pat. Nos. 4,259,188 and 3,814,261. The cartridge-type filters are shown and described in U.S. Pat. Nos. 3,319,793 and 3,050,193. However, there is no known device in the filter art providing for the use of a single filter housing which accommodates both a filter bag or a filter cartridge without the necessity of reversing liquid flow through the filter.

It is a purpose of this invention to provide a cartridge-carrying insert which is adapted to be fitted within an existing housing for a filter bag.

The filter includes a liquid impervious basket having a generally cylindrical side wall and a bottom wall. The basket bottom wall supports at least one cartridge carried over a filter outlet. To convert the filter from a bag to a cartridge-type, the bag is removed and the basket fitted into the filter housing in a support relationship under the filter inlet. This invention will have use in single element and multiple element filters of the type illustrated in U.S. Pat. Nos. 3,814,261 and 4,022,693.

Accordingly, it is an object of this invention to provide a novel and useful liquid filter which can be converted between bag and cartridge usage.

Another object of the invention is to provide a liquid filter which may be used with either filtering bags or filtering cartridges without changing direction or diverting liquid flow through the filter.

Another object of the invention is a filter which may be converted from use with a filter bag to use with a filter cartridge in a simple and rapid manner.

Other objects of this invention will become apparent upon a further reading of the description.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to utilize the invention.

Figure 1:
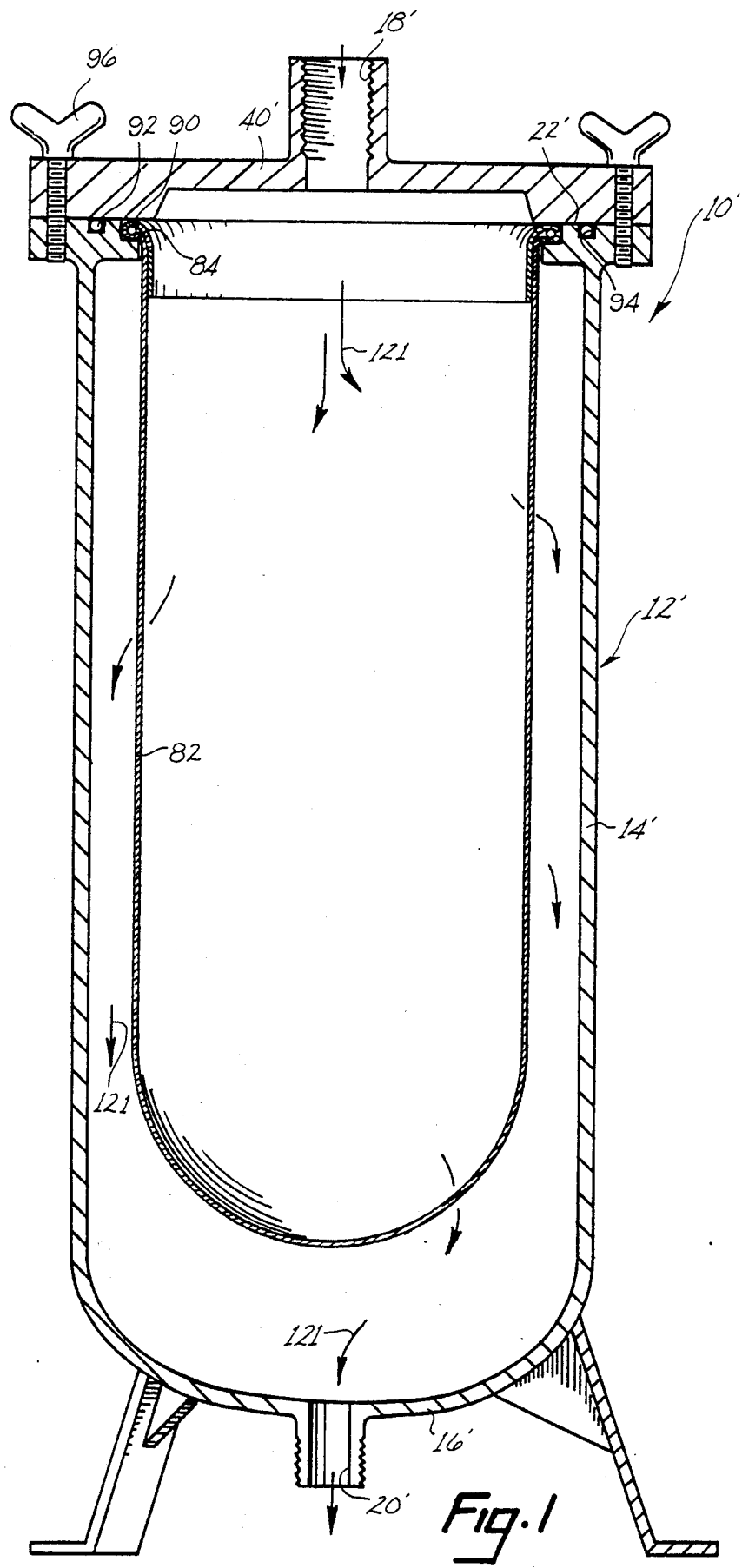
FIG. 1 is a longitudinal sectional view of a second embodiment of the filter shown accommodating a filter bag.
Figure 2:
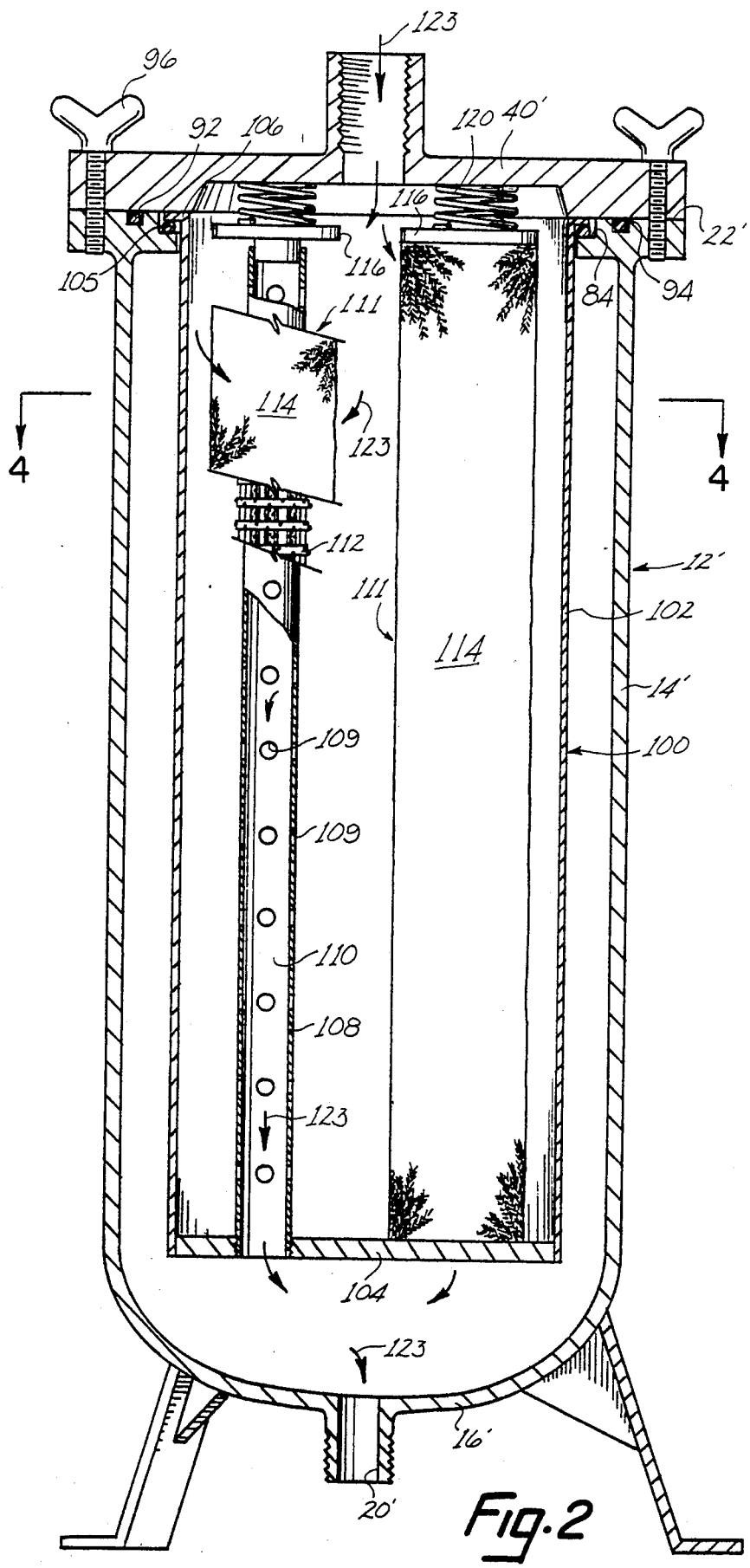
FIG. 2 is a longitudinal sectional view of the housing of the filter of FIG. 1 shown accommodating several filtering cartridges and taken along line 2—2 of FIG. 4 with one cartridge and its supporting post having portions broken away for illustrative purposes.
Figure 4:
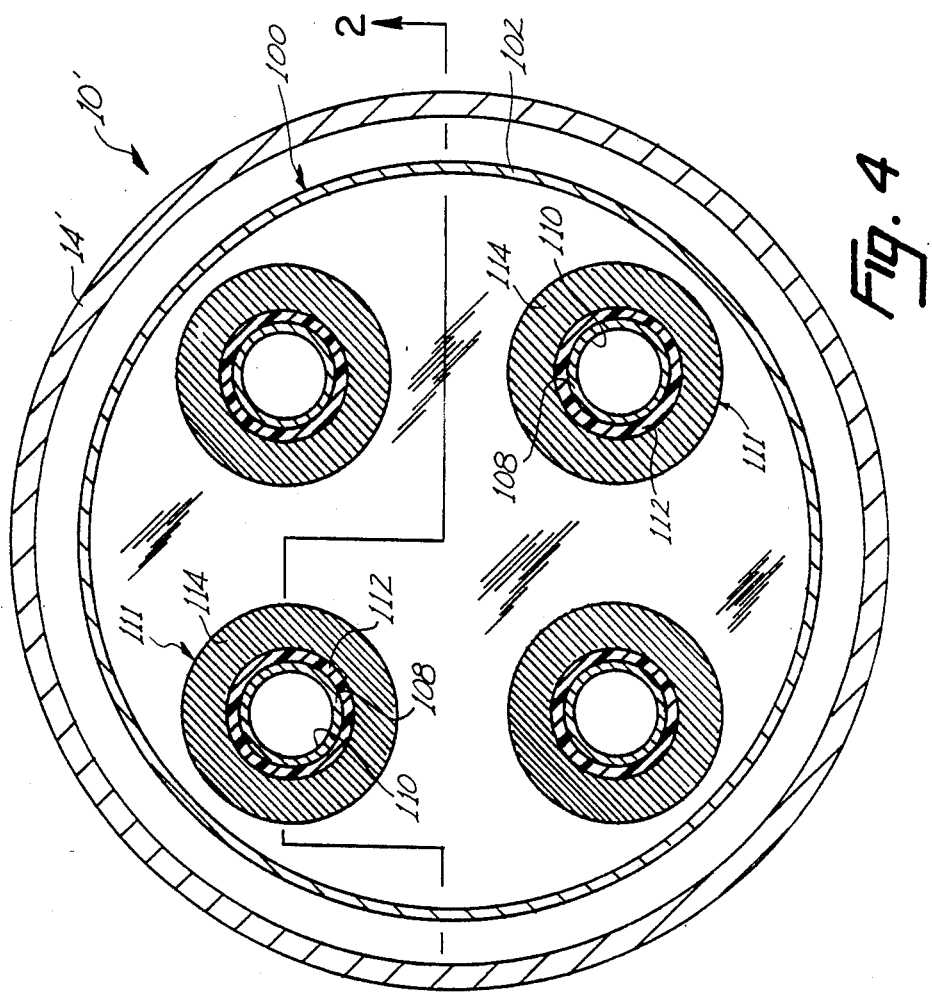
FIG. 4 is a horizontal sectional view taken along line 4—4 of FIG. 2.

The filter shown in FIGS. 1 and 2 where an inlet 18' for the filter 10' is in the filter cover 40'. Filter 10' includes a housing 12' having a side wall 14' and a bottom wall 16'. An outlet 20' is formed in housing bottom wall 16'. A circular shoulder 84 is formed in the upper edge 22' of side wall 14'. A filtering bag 82 is suspended within housing 12' with the shape-retaining upper margin 90 of the bag resting on shoulder 84. An O-ring 92 is seated in a groove 94 in side wall upper edge 22' and provides for peripheral sealing contact between cover 40' and the side wall upper edge. When cover 40' is fastened to housing 12', such as by tightening holddown nuts 96, bag upper margin 90 is compressed against shoulder 84. It is to be understood that the manner in which bag 82 is sealed at its upper margin can vary from the manner shown. Also a basket could be utilized with bag 82 as shown in U.S. Pat. No. 3,814,261.

Figure 3:
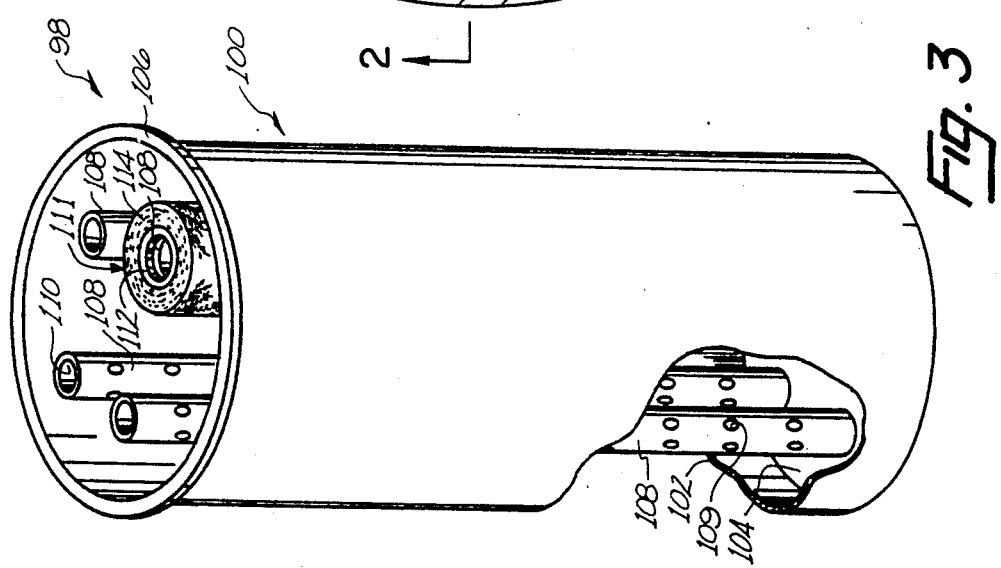
FIG. 3 is a perspective view of the filter cartridge insert used in the filter of FIG. 2 with portions broken away for purposes of illustration.

Adaptation of filter 10' for use as a cartridge-type filter is accomplished by removing bag 82 from housing 12' and inserting filter cartridge insert 98 (shown individually in FIG. 3) into the housing. Filter cartridge insert 98 includes a liquid impervious cylindrical basket 100 having a side wall 102 and a bottom wall 104. The basket side wall 102 terminates at its upper end in an outturned flange 106. When basket 100 is inserted into housing 12', basket flange 106 in compressive contact with cover 40' is supported by housing shoulder 84 and sealed thereagainst by an O-ring 105. Basket bottom wall 104 carries reticulated tubular center posts 108 which extend upwardly from the bottom wall. Each center post 108 has a central passage 110 which is aligned with an opening through basket bottom wall 104. Each center post 108 is adapted to support a filter cartridge 111 which includes a reticulated cylindrical frame 112 wrapped with fiber 114. Each cartridge frame 112 slides over a center post 108 and is topped by a cap 116 to seal the upper end of its central passage 110. A helical spring 120 in contact with cover 40' presses against each cap 116 to seal and anchor the underlying cartridge.

When in use as a bag-type filter as shown in FIG. 1, liquid, as shown by arrows 121, enters filter 10' through inlet 18', passing directly into bag 82 where it is filtered as it flows through the bag into housing 12'. The fluid exits housing 12' through outlet 20'. Conversion of filter 10' from a bag-type filter to a cartridge-type filter includes removing cover 40', lifting bag 82 from housing 12', placing basket 100 in its place within the housing, and replacing the cover. Liquid, as shown by arrows 123 in FIG. 2, then enters filter 10' through inlet 18' passing into basket 100 where it passes through each filter cartridge 111 and openings 109 in supporting center post 108, into center passage 110 of the post. From post center passage 110, the liquid flows through basket bottom wall 104 and into housing 12' where it exits the housing through outlet 20'.

It should also be understood that the invention is not to be limited by the terms of the above description and may be modified within the scope of the appended claims.

What we claim is:

1. A liquid filter comprising in combination a filter housing and removable cover, said filter housing including a chamber defined by side and bottom walls and having an open top defined by said side wall, means defining a liquid inlet port into and a liquid outlet port from said housing chamber, said cover for spanning said housing open top in associated sealing engagement with said housing, a filtration means removably positioned within said housing chamber in liquid flow communication between said inlet and outlet ports for filtering liquid flowing though said filter housing between said ports, said filtration means including a basket having a side wall and a bottom wall, said basket bottom wall having means defining an opening formed therethrough, said filtration means including a cartridge element of tubular-shaped reticulated material supported over and in liquid flow communication with said basket bottom wall opening, means for supporting said basket between said inlet and outlet ports, wherein liquid after passing into said housing chamber through said inlet port flows into said basket and through said cartridge element and said basket bottom wall opening and out said housing chamber through said outlet port.

2. The filter of claim 1 wherein said filtration means includes an upstanding reticulated post carried by said basket bottom wall, said post defining a longitudinal liquid flow passage aligned with said basket bottom wall opening, said cartridge element fitted over said post.

3. The filter of claim 2 wherein said cartridge element has an upper end, said post having an open upper end, a cap fitted over said post upper end upon the upper end of said cartridge element to seal said cartridge element upper end.

4. The filter of claim 3 and biasing means carried between said cap and said cover when the cover is in sealing engagement with said housing for pressing said cap downwardly upon said cartridge element.

5. A liquid filtering insert for converting a bag-type filter having means defining an inlet and outlet into a cartridge-type filter, comprising a basket having a side wall and a bottom wall, said basket having an open top defined by said side wall, a reticulated post carried by said basket, said basket having means defining a second opening other than said basket open top, said post having means defining a flow passage aligned with said basket opening, said cartridge-type filter supported upon said post whereby liquid entering said basket through its open top from said filter inlet flows through said cartridge-type filter and said post and said basket second opening to exit said filter housing through the filter outlet.

6. A liquid filtering insert for converting a bag-type filter to a cartridge-type filter having means defining an inlet and outlet, comprising a basket having a side wall and a bottom wall, said basket having an open top defined by said side wall, a reticulated post carried within said basket, said post having means defining a flow passage aligned with said basket having means defining a second opening other than said open top through said basket, said cartridge-type filter supported upon said post whereby liquid entering said basket from the open top flows through said cartridge-type filter and said post and said basket second opening to exit said filter housing through the filter outlet.

7. A liquid filtering insert for converting a bag-type filter to a cartridge-type filter having means defining an inlet and outlet, comprising a basket having a side wall and a bottom wall, said basket having an open top defined by said side wall, said basket having means defining a second opening other than said open top through said basket, said cartridge-type filter positioned by a support means over and in liquid flow communication with said basket second opening whereby liquid entering said basket from the open top flows through said cartridge-type filter and said basket second opening to exit said filter housing through the filter outlet.

* * * * *